United States Patent [19]
Klein

[11] Patent Number: 6,108,719
[45] Date of Patent: *Aug. 22, 2000

[54] SYSTEM FOR REDIRECTING PARTICULAR I/O OPERATIONS TO MEMORY

[75] Inventor: Dean A. Klein, Eagle, Id.

[73] Assignee: Micron Technology, Inc., Boise, Id.

[*] Notice: This patent is subject to a terminal disclaimer.

[21] Appl. No.: 09/417,954

[22] Filed: Oct. 13, 1999

Related U.S. Application Data

[63] Continuation of application No. 08/756,171, Nov. 25, 1996, abandoned.

[51] Int. Cl.$^7$ .................................................. G06F 13/00
[52] U.S. Cl. .................................. 710/10; 710/3; 710/5; 710/8
[58] Field of Search .................................. 710/10, 8, 3, 5, 710/14, 31, 38, 51, 131; 709/1; 712/208, 211; 713/1; 711/211

[56] References Cited

U.S. PATENT DOCUMENTS

| | | | |
|---|---|---|---|
| 4,028,678 | 6/1977 | Moran | 711/115 |
| 4,253,145 | 2/1981 | Goldberg | 703/21 |
| 4,291,371 | 9/1981 | Holtey | 710/264 |
| 5,165,023 | 11/1992 | Gifford | 710/131 |
| 5,418,752 | 5/1995 | Harari et al. | 365/218 |
| 5,455,915 | 10/1995 | Coke | 710/113 |
| 5,504,869 | 4/1996 | Uchida | 712/214 |
| 5,526,503 | 6/1996 | Kim | 711/203 |
| 5,530,895 | 6/1996 | Enstrom | 710/9 |
| 5,590,283 | 12/1996 | Hillis et al. | 712/29 |
| 5,590,376 | 12/1996 | Kou | 710/19 |
| 5,604,875 | 2/1997 | Munce et al. | 710/131 |
| 5,623,645 | 4/1997 | Yip et al. | 713/400 |
| 5,649,175 | 7/1997 | Kanekal et al. | 713/400 |
| 5,655,105 | 8/1997 | McLaury | 711/169 |
| 5,655,148 | 8/1997 | Richman et al. | 710/8 |
| 5,668,949 | 9/1997 | Nardone et al. | 709/201 |
| 5,706,466 | 1/1998 | Dockser | 711/125 |
| 5,796,984 | 8/1998 | Pearce et al. | 703/24 |

Primary Examiner—Thomas C. Lee
Assistant Examiner—Harold Kim
Attorney, Agent, or Firm—Dorsey & Whitney LLP

[57] ABSTRACT

A computer system is described in which a table created in memory includes drive description data for one or more IDE devices included in the system. A command intercept circuit is described which intercepts device-identification commands and reroutes the device-identification operation to memory. The command intercept circuit includes an address decode circuit which asserts a first control signal upon decoding an address corresponding with the one or more IDE devices. A command decode circuit responds to the asserted first control signal to decode data and asserts a second control signal when the decoded data corresponds with a device-identification command. An address generator responds to the asserted second control signal to generate a memory address where the drive description data table is stored.

30 Claims, 2 Drawing Sheets

SYSTEM FOR REDIRECTING PARTICULAR I/O OPERATIONS TO MEMORY

CROSS-REFERENCE TO RELATED APPLICATION

This application is a continuation of application Ser. No. 08/756,171, filed on Nov. 25, 1996, now abandoned.

TECHNICAL FIELD

This invention relates generally to computer systems, and more particularly, to a system for identifying data storage devices used in computer systems.

BACKGROUND OF THE INVENTION

The use of computers, especially personal computers (PCs) is widespread. The computing power of the PC, whether coupled to a network or operating as a stand-alone device, has increased significantly as new computer designs move into production. Central processing units have become faster and more complex with each new generation of PC. Memory chips have also increased in both capacity and speed. Other elements, such as disk drives and compact disk read-only memory drives are common on PCs.

As the new computer designs have consistently increased computing power, the complexity of the programs that run the computer has correspondingly increased. To take advantage of the increased computing power, operating systems, such as Microsoft MSDOS® and Microsoft Windows® 95, have become more complex. As a result, the installation and setup of a new computer can be extremely complex, especially for individuals with little or no technical training.

Certain computer devices, such as integrated device electronics (IDE) devices and "plug and play" interface boards, have the ability to be identified by the computer operating system and/or other system management software, which is then configured accordingly. But while the speed of central processing units and memories have increased, there are limitations to the speed at which the IDE devices can transfer data, including data used to identify the devices. For example, writing an auto-identification command to an IDE disk drive is slow relative to the processing speed of the central processing unit, as is reading drive-identifying data retrieved from the IDE disk drive. Further, currently available schemes for managing multiple drive systems and/or protecting regions on a drive that might otherwise be used by system management software are awkwardly implemented and result in sub-optimal system performance. Therefore, it can be appreciated that there is a significant need for an improved system and method for identification of computer data storage devices. The present invention provides this and other advantages as will be apparent from the following detailed description and accompanying figures.

SUMMARY OF THE INVENTION

According to the present invention, a computer system is provided in which a table created in memory includes device description data for one or more I/O devices included in the system. The device description data is first transferred to memory during initialization of the computer system. Once stored in memory, the device description data can be modified and/or combined with other device description data to produce a "virtual" device description data table. Subsequent device-identification commands are then intercepted and the "virtual" device description data retrieved.

A command intercept circuit is described which intercepts the device-identification commands and reroutes the device-identification operation to memory. The command intercept circuit includes an address decode circuit which asserts a first control signal upon decoding an address corresponding with the one or more IDE devices. A command decode circuit responds to the asserted first control signal to decode data and asserts a second control signal when the decoded data corresponds with a device-identification command. An address generator responds to the asserted second control signal to generate a memory address where the drive description data table is stored.

A computer system, according to the present invention, includes a processor and a memory for storing data at locations addressable by the processor. An I/O device is provided which is addressable by the processor and transfers data to and from the processor. A system controller couples the memory with the processor, as well as the I/O device with the processor, and controls the transfer of data and address information between the memory and the processor, as well as between the I/O device and the processor. The command intercept circuit is coupled with the processor and with the memory. The command intercept circuit selectively intercepts certain data transfer operations addressed by the processor to the I/O device and reroutes these operations to the memory.

DETAILED DESCRIPTION OF THE INVENTION

A novel system and method is described for identifying data storage devices used in computer systems. In the following description, specific details are set forth in order to provide a sufficient understanding of the present invention. It will be obvious, however, to one skilled in the art that the present invention may be practiced without these details. In other instances, well-known circuits, control signals and timing protocols have not been shown in detail in order not to unnecessarily obscure the invention.

Figure 1:
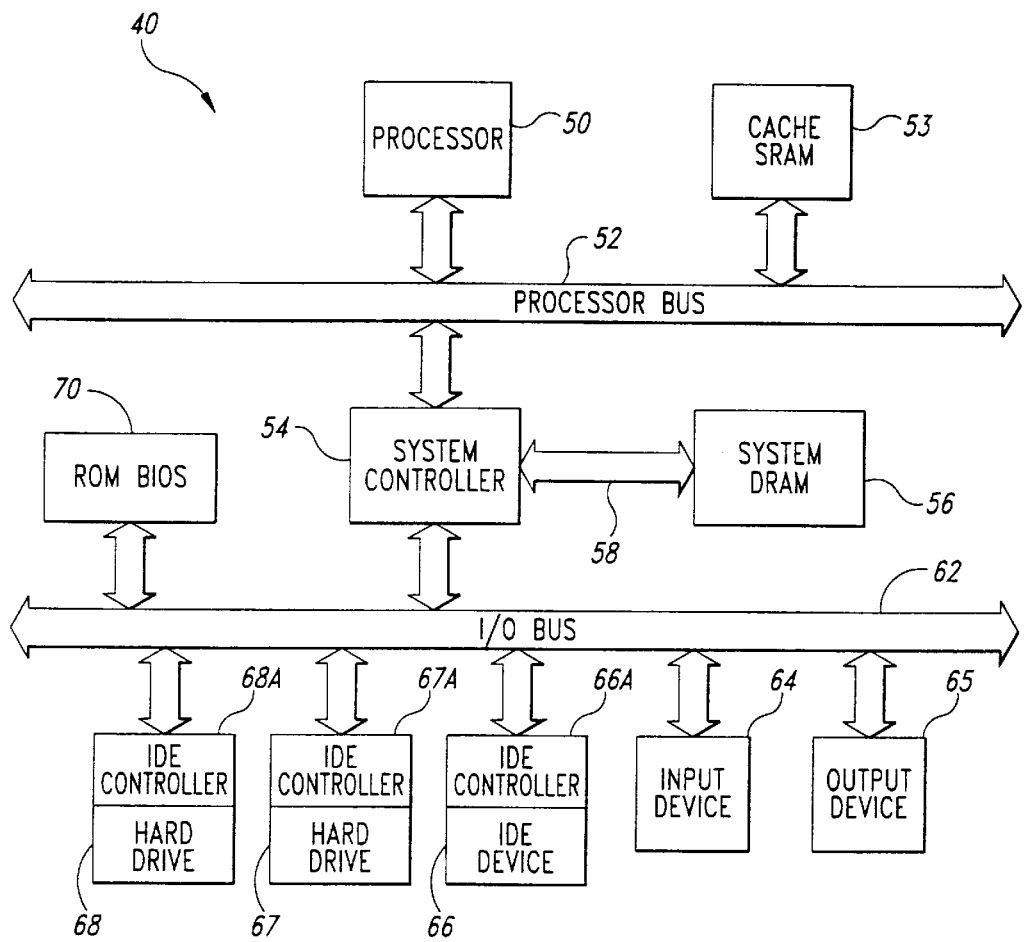
FIG. 1 is a functional block diagram of a computer system having a system controller according to the present invention.

FIG. 1 shows a computer system 40, such as an IBM compatible personal computer, according to the present invention. A microprocessor 50, such as the Pentium™ processor, is connected to a processor bus 52 which carries address, data and control signals. The processor bus 52 is in turn connected to a system controller 54 and a cache memory 53, such as a static random access memory (SRAM) array. The system controller 54 acts as a memory controller accessing a main memory, such as a system dynamic random access memory (DRAM) 56, via a memory bus 58 which carries address, data and control signals. The system DRAM 56 can include any of various known memory devices, such as DRAM devices manufactured by Micron Technology, Inc.

The system controller 54 also serves as a bridge circuit between the processor bus 52 and an expansion or I/O bus 62. The I/O bus 62 may itself be a combination of one or more bus systems with associated interface circuitry (e.g., PCI bus with connected SCSI and ISA bus systems). Connected to the I/O bus 62 are multiple I/O devices 64–68. One or more data input devices 64, such as a keyboard, mouse, etc., are coupled to the I/O bus 62. Similarly, one or more data output devices 65, such as visual display devices, printers, etc., are coupled to the I/O bus 62. Also coupled to the I/O bus 62 are integrated device electronics (IDE) devices 66–68, together with associated IDE controllers 66A–68A. Included are hard drives 67 and 68, and a generic IDE device 66 representing one or more additional IDE devices, such as tape drives, CD-ROM drives, or additional hard drives. It should be understood that some IDE devices can share a common controller. For example, the hard drives 67, 68 and the generic IDE device 66 could all be controlled by a single enhanced-IDE (EIDE) controller instead of the separate IDE controllers 66A–68A illustrated in FIG. 1. IDE devices are well known to those skilled in the art, and need not be discussed in detail.

A read-only memory basic input/output system (ROM BIOS) 70 is coupled to the I/O bus 62 and provides various well-known instruction sets to the microprocessor 50. Included are the start-up routines for power-on self-test (POST), system configuration initialization, and disk boot (in which a computer operating system program is located and instructions therefrom executed by the microprocessor 50). The ROM BIOS 70 also includes hardware interrupt handling and program service request handling routines. The program service request handling routines attend to the details of interacting with I/O devices and service those requests initiated by software programs to, for example, read information from a hard drive, clear a display screen, or write information to a printer. The hardware interrupt handling routines handle requests initiated by hardware components of the computer system, such as when a key is pressed on a keyboard.

Under control of instructions provided by the BIOS 70, the microprocessor 50 initializes various system components by checking for system configuration information (typically stored in a battery powered CMOS memory) and/or electronically interrogating the system components and checking for a response. One such interrogation is the well-known "Identify Drive" command, to which the IDE devices 66–68 respond by providing drive description data, which typically includes the drive manufacturer, performance capabilities, geometry of the drive, etc. A typical response from one of the hard drives 67, 68 is illustrated below in Table 1.

TABLE 1

DATA FORMAT

| Word | Bit 7/15 | Bit 6/14 | Bit 5/13 | Bit 4/12 | Bit 3/11 | Bit 2/10 | Bit 1/9 | Bit 0/8 |
|---|---|---|---|---|---|---|---|---|
| 0 | mv1 = 1 | CMD PKT DRQ = 01b | 0 | 0 | 0 | | P Size = 00b | |
| | | Protocol = 10b | | | | Device Type = 000101b | | |
| 1 . . . 9 | | Not used or reserved = all zero | | | | | | |
| 10 . . . 19 | | Serial Number = all zero (Not supported) | | | | | | |
| 20 | | Buffer Type = 0000h (Not supported) | | | | | | |
| 21 | | Transfer Size = 0080h (128K Bytes) {FX001DEFXN01DE} = 0100h (256K bytes) {FX002DEFXN02DE} | | | | | | |
| 22 | | Not used = 0000h | | | | | | |
| 23 . . . 26 | | Firmware Version = E??? | | | | | | |
| 27 . . . 46 | | Model Number = 'FX001DE' = 'FXN01DE' = 'FX002DE' = 'FXN02DE' | | | | | | |
| 47 | | Not used = 000h | | | | | | |
| 48 | | Double Word I/O = 0000h (Not supported) | | | | | | |
| 49 | | Vendor Unique = 00h | | | | | | |
| | 0 | 0 | 0 | 0 | IORDY = 0 | PRG = 0  LBA = 10 | DMA = 0 | |
| 50 | | Reserved = 0000h | | | | | | |
| 51 | | PIO Cycle Timing = 0000h (Mode 0) {FX001DE} = 0200h (Mode 2) {FX002DE} | | | | | | |
| 52 | | DMA Cycle Timing = 0000h (Not supported) | | | | | | |
| 53 . . . 61 | | Not used = all zero | | | | | | |
| 62 | | Singleword DMA Mode = 0000h (Not supported) | | | | | | |
| 63 | | Multiword DMA Mode = 0000h (Not supported) | | | | | | |
| 64 | | Enhanced PIO Mode Mode 3 = 0000h (Not supported) | | | | | | |
| 65 | | Blind PIO minimum cycle time = 0000h (Not supported) | | | | | | |
| 66 | | Recommended Multiword DMA Cycle Time = 0000h (Not supported) | | | | | | |
| 67 | | Minimum PIO Cycle Time without Flow Control = 024Dh (589 ns) {FX001DE} = 00EAh (234 ns) {FX002DE} | | | | | | |
| 68 | | Minimum PIO Cycle Time with IORDY = 0000h | | | | | | |
| 69 . . . 255 | | Reserved = all zero | | | | | | |

In accordance with the present invention, this drive description data is transferred to the system DRAM 56 for storage therein. Preferably, the BIOS 70 routines cause the microprocessor 50 to initiate a direct memory access (DMA) transfer of the drive description data from each of the IDE devices 66–68 to the system DRAM 56. Alternatively, a programmed I/O or interrupt-driven I/O transfer of the drive description data is acceptable. Once stored in the system DRAM 56, the drive description data of the IDE devices 66–68 can be manipulated under software control, and a modified or "virtual" drive description data set is created which differs from the drive description data associated with the "actual" drive(s) employed.

One advantage of creating such a virtual drive is that certain storage regions of an actual drive can be protected from access by a computer operating system, system utilities and/or application software. Another advantage is that a plurality of actual drives can be logically combined to appear to the computer operating system, system utilities and/or application software as a single virtual drive. Similarly, an appropriate set of drive description data for a single virtual drive can be created for systems in which data is striped amongst multiple drives under hardware control, such as the well-known RAID (redundant array of independent disks) scheme. Those skilled in the art will appreciate additional advantages associated with the software definition of virtual drive parameters.

Once POST and system initialization are complete, the BIOS 70 routines cause the microprocessor 50 to retrieve and start a computer operating system program, such as MSDOS®. In particular, instructions within the BIOS 70 transfer control of the microprocessor 50 to a file within MSDOS called IO.SYS. The IO.SYS file further initializes the computer system 40 in a well-known manner and also loads a data file called CONFIG.SYS which configures hardware and software for proper operation. For example, the system DRAM 56 can be configured to reserve space for certain application programs, the number of I/O channels and buffer sizes are selected, and certain software routines (known as drivers) for accessing I/O devices are loaded into the system DRAM. The operation of the files IO.SYS and CONFIG.SYS are well known to those skilled in the art, and need not be discussed in detail. Computer operating systems other than MSDOS have similar files with similar functional characteristics.

In particular, the computer operating system loads software drivers for the IDE devices 66–68 into the system DRAM 56. As part of the hardware and software initialization/configuration, the computer operating system may cause the microprocessor 50 to initiate an I/O cycle and issue the "Identify Drive" command for one or more of the IDE devices 66–68. In accordance with the present invention, this command is intercepted and the I/O cycle is rerouted to a memory cycle accessing the virtual drive description data stored in the system DRAM 56. Similarly, any application software routines which attempt to access the drive description data associated with one or more of the IDE devices 66–68 will receive the virtual drive description data stored in the system DRAM 56.

Figure 2:
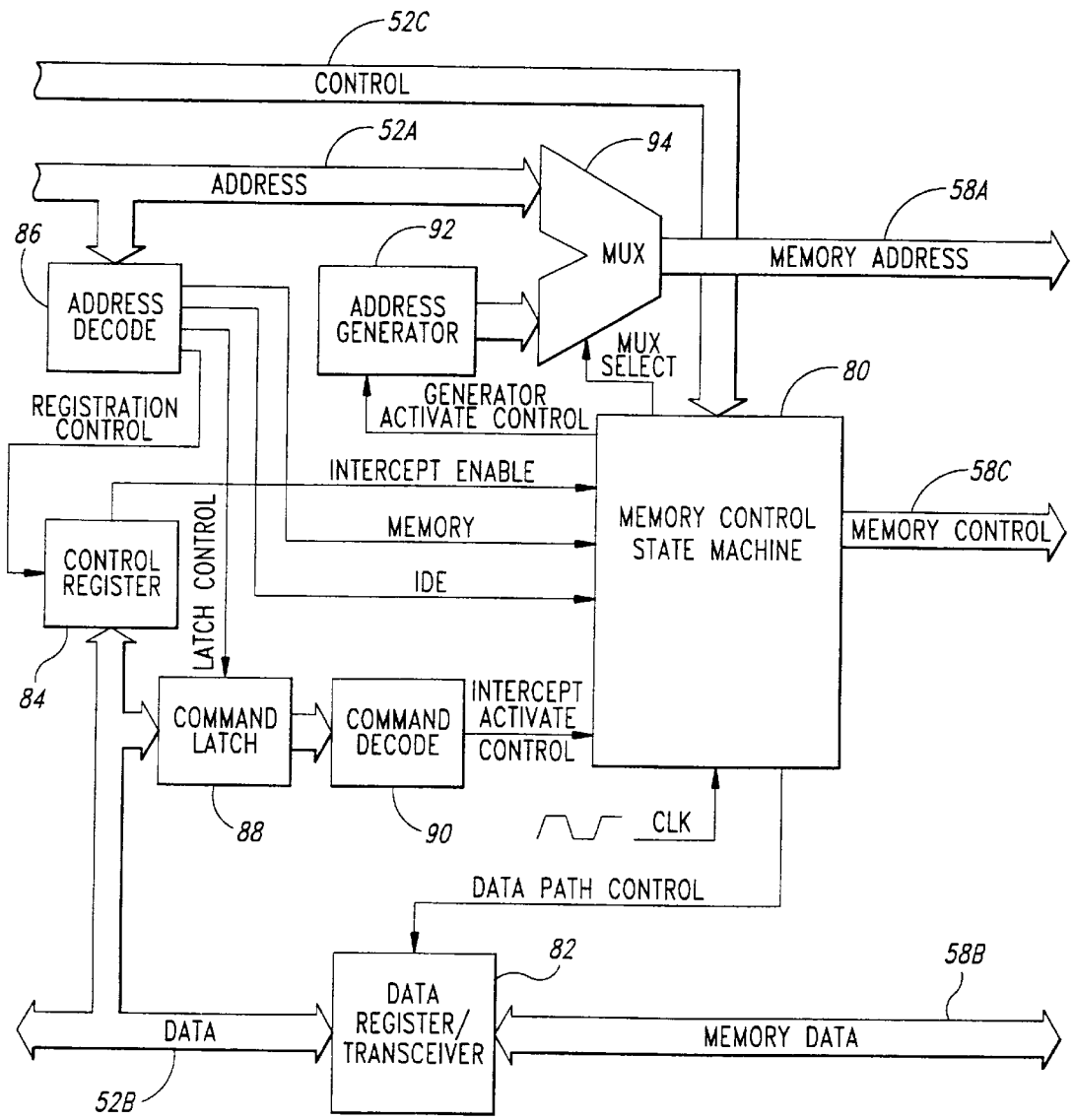
FIG. 2 is a functional block diagram of a portion of the system controller of FIG. 1.

FIG. 2 shows a portion of the system controller 54 of FIG. 1 which intercepts and reroutes the "Identify Drive" I/O command. In order not to unnecessarily obscure the invention, other portions of the system controller 54 are omitted, and only those interconnections necessary to describe the invention are included. The address, data and control portions of the processor bus 52 of FIG. 1 are shown individually as the address bus 52A, data bus 52B and control bus 52C, respectively. Similarly, the address, data and control portions of the memory bus 58 of FIG. 1 are shown individually as the memory address bus 58A, memory data bus 58B and memory control bus 58C, respectively.

A memory control state machine 80 receives control signals from the processor 50 (see FIG. 1) on the control bus 52C. These control signals are well known and include those identifying the status of the address bus 52A, defining bus cycle types (e.g., memory read or write, I/O read or write), arbitrating bus ownership, and controlling burst cycles. The memory control state machine 80 in turn issues signals controlling the functioning of the system DRAM 56 on the memory control bus 58C. Well-known memory control signals include row address strobe (RAS), column address strobe (CAS), write enable (WE) and output enable (OE). The memory control state machine 80 receives a clock signal CLK, which may be the system clock signal received by the microprocessor 50, and controls the timing of data transfer between the processor data bus 52B and the memory data bus 58B via a data path register/transceiver 82.

During execution of the system configuration initialization routines stored within the BIOS 70, a control register 84 is programmed with values which effect the functions of the system controller 54. An address decode circuit 86 receives address information on the address bus 52A and controls registration of data provided on the data bus 52B in the control register 84. When the "Identify Drive" command intercept function is employed, values programmed in the control register 84 produce an intercept enable signal which is input to the memory control state machine 80 and enables control circuitry therein (not shown) to produce corresponding control signals described below. Also, comparison data is written to the address decode circuit 86 and a command decode circuit 90, allowing these circuits to subsequently recognize IDE addresses and the "Identify Drive" command, respectively. Additional details concerning the programming of the control register 84 and corresponding effects on system functions are well known to those skilled in the art, and need not be discussed in detail.

Also included in the command intercept circuitry are a command latch circuit 88, an address generator 92, and an address multiplexer 94. When one of the IDE devices 66–68 of FIG. 1 is addressed, the address decode circuit 86 asserts a control signal which latches the contents of the data bus 52B in the command latch circuit 88. The command latch circuit 88 provides the latched data to the command decode circuit 90. The address decode circuit 86 also asserts an IDE signal to the memory control state machine 80, indicating that an I/O operation to an IDE device has begun. If the data latched in the command latch circuit 88 corresponds to an "Identify Drive" command, the command decode circuit 90 asserts a control signal to activate the control circuitry within the memory control state machine 80. In turn, the memory control state machine 80 asserts an activation control signal to cause the address generator 92 to produce address information corresponding to the location of the virtual drive description data stored in the system DRAM 56. The memory control state machine 80 also produces a mux select signal causing the address mux 94 to pass the output of the address generator 92 to the memory address bus 58A. The address generator 92 includes a base address register (not shown), which is programmed during system initialization, and a counter (not shown) for generating a series of addresses sufficient to access the entire virtual drive description data set stored in the system DRAM 56.

In the event of a regular memory access, the address decode circuit 86 asserts a memory signal to the memory control state machine 80, indicating that the address carried on the address bus 52A is for a location in the system DRAM 56. The control signals produced by the address decode circuit 86 and the command decode circuit 90 are deasserted, and the memory control state machine 80 issues a mux select signal causing the address mux 94 to pass the contents of the address bus 52A to the memory address bus 58A The memory cycle then continues according to conventional protocols.

Each of the circuits whose function and interconnection is described above in connection with FIGS. 1 and 2 is of a type known in the art, and one skilled in the art would be able to use such circuits in the described combination to practice the present invention. The internal details of these particular circuits are not part of, nor critical to, the invention. Therefore, a detailed description of the internal circuit operation is not required. Similarly, details of software manipulation of the actual drive description data set(s) to create virtual drive description data set(s) is not described.

It will be appreciated that, although an embodiment of the invention has been described above for purposes of illustration, various modifications may be made without deviating from the spirit and scope of the invention. Those skilled in the art will appreciate that any number of well-known processor, system controller and bus types could be employed according to the present invention. Also, the IDE command intercept circuitry need not be integrated within the system controller, although it is preferable to do so. Additionally, one or more of the circuits within the command intercept circuitry could be omitted, such as the command latch circuit 88, or have its function integrated into others of the described circuits. Further, certain control signals could be routed differently, such as the control signal produced by the command decode circuit 90 being provided directly to the address generator 92 and/or the address mux 94.

Those skilled in the art will also appreciate that certain of the IDE devices contained within a computer system may be subject to the virtual drive creation and auto-identification intercept function, whereas other IDE devices are not. Additionally, the present invention applies to any device which provides device-identifying data in response to an auto-identification command, and not just the particular IDE-type devices described. Indeed, numerous variations are well within the scope of this invention. Accordingly, the invention is not limited except as by the appended claims.

What is claimed is:

1. A computer system, comprising:
   a processor operable to issue a query for I/O device configuration information;
   an I/O device addressable by the processor, the I/O device storing I/O configuration information for the I/O device and being operable to transfer the I/O configuration information to the processor in response to a query for I/O device configuration information addressed to the I/O device;
   a memory for storing data at locations addressable by the processor, the memory storing the I/O configuration information for the I/O device that has been transferred from the I/O device;
   a system controller coupling the memory with the processor and controlling the transfer of data and address signals between the memory and the processor, the system controller further coupling the I/O device with the processor and controlling the transfer of data between the I/O device and the processor; and
   an intercept circuit coupled with the processor and with the memory, the intercept circuit being operable to intercept the query for I/O device configuration information addressed by the processor to the I/O device and reroute the operation to a corresponding location in the memory that contains I/O device configuration information transferred from the I/O device.

2. The computer system of claim 1, wherein the intercept circuit is integrated within the system controller.

3. The computer system of claim 1, wherein the query for I/O device information comprises an identify drive command, wherein the I/O device configuration information comprises drive description data and wherein the I/O device is operable to provide the drive description data in response to receiving the identify drive command.

4. The computer system of claim 1, wherein the intercept circuit includes:
   an address decode circuit operable to receive a first address provided by the processor and produce a first control signal in response thereto, the first control signal having asserted and deasserted states, the first control signal having the asserted state when the first address corresponds with the I/O device;
   a command decode circuit operable to respond to the asserted state of the first control signal to decode data provided by the processor and produce a second control signal in response thereto, the second control signal having asserted and deasserted states, the second control signal having the asserted state when the decoded data corresponds with a device-identification command; and
   an address generator operable to respond to the asserted state of the second control signal to produce a second address corresponding with the first address.

5. The computer system of claim 4, wherein the I/O device is an integrated device electronics device and provides device-identification data in response to receiving the device-identification command, and wherein the second address corresponds with a location in the memory where at least a portion of the device-identification data is stored.

6. The computer system of claim 1, wherein the I/O device is an integrated device electronics device and provides device-identification data in response to receiving a device-identification command.

7. The computer system of claim 1, wherein the I/O device is an integrated device electronics device and provides device-identification data in response to receiving a device-identification command, and wherein the intercept circuit intercepts the device-identification command and addresses a corresponding location in the memory.

8. The computer system of claim 1 wherein the processor is operable to transfer the I/O configuration data for the I/O device from the I/O device to the memory during initialization of the computer system.

9. A command intercept circuit for use in a computer system having a processor, a memory for storing information at locations addressable by the processor, and an I/O device addressable by the processor and operable to transfer information to and from the processor, including the transfer to the processor of identifying data in response to data received from the processor corresponding to an I/O device identification command, the command intercept circuit comprising:
   an address decode circuit operable to receive a first address provided by the processor and produce a first control signal in response thereto, the first control signal having asserted and deasserted states, the first control signal having the asserted state when the first address corresponds with the I/O device;
   a command decode circuit operable to respond to the asserted state of the first control signal to decode data provided by the processor and produce a second control signal in response thereto, the second control signal having asserted and deasserted states, the second control signal having the asserted state when the decoded data corresponds with the I/O device identification command; and
   an address generator operable to respond to the asserted state of the second control signal to produce a second address corresponding to the first address, the second address corresponding to a location in the memory where at least a portion of the identifying data is stored.

10. The command intercept circuit of claim 9, further comprising a control state circuit operable to receive the second control signal and to responsively provide an activation signal to the address generator, the activation signal having asserted and deasserted states corresponding with the asserted and deasserted states of the second control signal, respectively.

11. The command intercept circuit of claim 9, further comprising an address multiplexer operable to receive each of the first and second addresses and to selectively provide the first address or the second address to the memory, the second address being provided to the memory in response to the asserted state of the second control signal.

12. The command intercept circuit of claim 11, further comprising a control state circuit operable to receive the second control signal and to responsively provide an activation signal to the address generator, the activation signal having asserted and deasserted states corresponding with the asserted and deasserted states of the second control signal, respectively, and wherein the control state circuit is further operable to provide a select signal in response to the second control signal, the select signal having first and second states corresponding with the deasserted and asserted states of the second control signal, respectively, the select signal being input to the address multiplexer to selectively provide the first and second addresses to the memory.

13. The computer system of claim 9 wherein the processor is operable to transfer the identifying data for the I/O device from the I/O device to the memory during initialization of the computer system.

14. The computer system of claim 9 wherein the I/O device comprises a disk drive, the I/O device identification command comprises an identify drive command, and the identifying data for the I/O device comprises drive description data.

15. A computer system, comprising:
   a processor operable to issue a query for I/O device configuration information;
   an I/O device addressable by the processor, the I/O device storing I/O configuration data for the I/O device and being operable to transfer the I/O configuration data to the processor in response to a device identification command addressed to the I/O device;
   a memory operable to store data at locations addressable by the processor, the memory storing the I/O configuration data that has been transferred from the I/O device; and
   an intercept circuit coupled with the processor and with the memory, the intercept circuit being operable to intercept the device-identification command addressed to the I/O device, the intercept circuit comprising:
      a command decode circuit operable to assert a control signal in response to receipt of the device-identification command; and
      an address generator operable to respond to the control signal asserted by the command decode circuit to produce a memory address corresponding with a location in the memory where at least a portion of the device-identification data is stored.

16. The computer system of claim 15, wherein the control signal asserted by the command decode circuit is a first control signal, and wherein the intercept circuit further comprises an address decode circuit operable to assert a second control signal upon receipt of an address corresponding with the I/O device, the second control signal being applied to the command decode circuit to enable operation thereof.

17. The computer system of claim 15, wherein the I/O device is an IDE device.

18. The computer system of claim 15 wherein the processor is operable to transfer the I/O configuration data for the I/O device from the I/O device to the memory during initialization of the computer system.

19. The computer system of claim 15 wherein the I/O device comprises a disk drive, the query for I/O device configuration information comprises an identify drive command, and the I/O configuration data for the I/O device comprises drive description data.

20. A computer system, comprising:
   a processor operable to issue respective device identification commands addressed to a plurality of I/O devices;
   an I/O device coupled to the processor and operable to transfer data to or from the processor, including device-identification data in response to a device-identification command addressed to the I/O device;
   a memory operable to store data at locations addressable by the processor, the memory storing device-identification data transferred from the I/O device; and
   a redirecting circuit coupled to the processor and to the memory, the redirecting circuit structured to intercept a device identification command from the processor directed to the I/O device and redirect it to a location in the memory already storing device identification data, the redirecting circuit including:
      a command decode circuit structured to produce a control signal when it receives the device-identification command, and
      an address generator structured to respond to the control signal by producing a memory address corresponding to the location in the memory where at least a portion of the device-identification data is stored.

21. The computer system of claim 20, wherein the control signal asserted by the command decode circuit is a first control signal, and wherein the intercept circuit further comprises an address decode circuit operable to assert a second control signal upon receipt of an address corresponding with the I/O device, the second control signal being applied to the command decode circuit to enable operation thereof.

22. The computer system of claim 20, wherein the I/O device is an IDE device.

23. The computer system of claim 20 wherein the processor is operable to transfer the device-identification data from the I/O device to the memory during initialization of the computer system.

24. The computer system of claim 20 wherein the I/O device comprises a disk drive, the device-identification command comprises an identify drive command, and the device-identification data comprises drive description data.

25. A computer system, comprising:
   a processor operable to issue a configuration identification command;
   an I/O device coupled to the processor and operable to transfer data to or from the processor in response to one of a set of commands, the I/O device being operable to transfer I/O configuration data to the processor in response to a configuration identification command addressed to the I/O device;
   a memory operable to store data at locations addressable by the processor, the memory storing I/O configuration data that has been transferred from the I/O device; and
   a redirect circuit coupled to the processor and to the memory, the redirect circuit structured to intercept the configuration identification command from the processor directed to the I/O device and redirect the configuration identification command to a location in the memory storing the I/O configuration data that has been transferred from the I/O device, the redirecting circuit including:
      a command decode circuit structured to produce a control signal when it receives the configuration identification command, and
      an address generator structured to respond to the configuration identification command by producing a memory address corresponding to the location in the memory where the I/O configuration data is stored.

26. The computer system of claim 25, wherein the control signal asserted by the command decode circuit is a first control signal, and wherein the intercept circuit further comprises an address decode circuit operable to assert a second control signal upon receipt of an address corresponding with the I/O device, the second control signal being applied to the command decode circuit to enable operation thereof.

27. The computer system of claim 25 wherein the configuration identification command comprises a device identification command.

28. The computer system of claim 25, wherein the I/O device is an IDE device.

29. The computer system of claim 25 wherein the processor is operable to transfer the I/O configuration data from the I/O device to the memory during initialization of the computer system.

30. The computer system of claim 25 wherein the I/O device comprises a disk drive, the configuration identification command comprises an identify drive command, and the I/O configuration data comprises drive description data.

* * * * *

UNITED STATES PATENT AND TRADEMARK OFFICE
CERTIFICATE OF CORRECTION

PATENT NO. : 6,108,719  
DATED : August 22, 2000  
INVENTOR(S) : Dean A. Klein

Page 1 of 1

It is certified that error appears in the above-identified patent and that said Letters Patent is hereby corrected as shown below:

<u>Title page,</u>
Item [54], Title, "SYSTEM FOR REDIRECTING PARTICULAR I/O OPERATIONS TO MEMORY" should read -- SYSTEM FOR REDIRECTING I/O DEVICE CONFIGURATION INFORMATION TO MEMORY FOR IDENTIFICATION OF DATA STORAGE DEVICES Signed and Sealed this Eighteenth Day of December, 2001

*Attest:*

*Attesting Officer*

JAMES E. ROGAN  
*Director of the United States Patent and Trademark Office*